US012060903B2

(12) United States Patent
Radanovic et al.

(10) Patent No.: US 12,060,903 B2
(45) Date of Patent: Aug. 13, 2024

(54) DEVICE FOR COMPENSATING FOR TOLERANCES BETWEEN TWO COMPONENTS TO BE CONNECTED TO ONE ANOTHER

(71) Applicant: WITTE Automotive GmbH, Velbert (DE)

(72) Inventors: Vladimir Radanovic, Cologne (DE); Glen Lee, Cologne (DE); Philipp Meissner-Linnemann, Essen (DE)

(73) Assignee: Witte Automotive GmbH, Velbert (DE)

( * ) Notice: Subject to any disclaimer, the term of this patent is extended or adjusted under 35 U.S.C. 154(b) by 187 days.

(21) Appl. No.: 17/804,315

(22) Filed: May 27, 2022

(65) Prior Publication Data

US 2022/0381281 A1 Dec. 1, 2022

(30) Foreign Application Priority Data

May 27, 2021 (DE) .................... 10 2021 205 410.2

(51) Int. Cl.
*F16B 13/04* (2006.01)
*F16B 29/00* (2006.01)

(52) U.S. Cl.
CPC .................................... *F16B 29/00* (2013.01)

(58) Field of Classification Search
CPC ........... F16B 5/024; F16B 5/025; F16B 29/00
(Continued)

(56) References Cited

U.S. PATENT DOCUMENTS 6,357,953 B1 * 3/2002 Ballantyne ............ F16B 5/0233
403/372
8,864,432 B2 * 10/2014 Figge ..................... F16B 5/025
411/383
(Continued)

FOREIGN PATENT DOCUMENTS

DE 60119882 T2 5/2007
DE 202007008643 U1 9/2007
(Continued)

OTHER PUBLICATIONS

European Patent Office, Extended Search Report in Application No. EP 22175690, dated Oct. 5, 2022, 7 pages. Munich Germany.
(Continued)

*Primary Examiner* — Gary W Estremsky
(74) *Attorney, Agent, or Firm* — Marshall & Melhorn, LLC

(57) ABSTRACT

A device for compensating for tolerances between two components to be connected to one another may have a hollow cylindrical base element. The base may also have a hollow cylindrical compensating element which is in thread engagement with the base element and which can be moved out of an initial position into a compensating position by rotation relative to the base element. The device may also have a connecting element extending at least through a first cavity of the device for connecting the two components. The first cavity may have an inner contour in cross section and the connecting element may have an outer contour in cross section. The inner contour may differ from the outer contour in such a way that when the inner contour and the outer contour are oriented concentrically at least one radial overhang is present.

13 Claims, 17 Drawing Sheets

(58) Field of Classification Search
USPC .......................................................... 411/34
See application file for complete search history.

(56) References Cited

U.S. PATENT DOCUMENTS

| | | | | |
|---|---|---|---|---|
| 11,725,689 | B2* | 8/2023 | Purwin | F16B 43/001 411/360 |
| 11,754,103 | B2* | 9/2023 | Figge | F16B 5/025 411/546 |
| 2006/0280579 | A1* | 12/2006 | Seidl | F16B 5/0233 411/546 |
| 2007/0009342 | A1* | 1/2007 | Figge | F16B 5/025 411/546 |
| 2007/0207012 | A1* | 9/2007 | Lorenzo | F16B 5/0233 411/546 |
| 2008/0038090 | A1* | 2/2008 | Figge | F16B 5/025 403/4 |
| 2012/0090146 | A1* | 4/2012 | Figge | F16B 5/025 29/428 |
| 2015/0075496 | A1* | 3/2015 | Pasquali | F02M 55/025 248/65 |
| 2015/0330427 | A1* | 11/2015 | Johnson | F16B 5/0233 411/34 |
| 2015/0330435 | A1* | 11/2015 | Schwarzbich | F16B 5/0283 411/16 |
| 2020/0400173 | A1* | 12/2020 | Figge | F16B 5/025 |

FOREIGN PATENT DOCUMENTS

| | | |
|---|---|---|
| DE | 102006034463 B3 | 1/2008 |
| DE | 102013216716 A1 | 2/2015 |
| DE | 102016208176 A1 | 11/2017 |
| DE | 102016208179 A1 | 11/2017 |
| EP | 1780424 A1 | 5/2007 |
| EP | 2049807 A1 | 4/2009 |

OTHER PUBLICATIONS

German Patent and Trade Mark Office, Search Report in Application No. DE 102021205410.2, dated Feb. 5, 2022, 8 pages, Munchen, Germany.

* cited by examiner

DEVICE FOR COMPENSATING FOR TOLERANCES BETWEEN TWO COMPONENTS TO BE CONNECTED TO ONE ANOTHER

FIELD

The invention relates to a device for compensating for tolerances between two components to be connected to one another.

BACKGROUND

Known devices for compensating for tolerances between two components (also called compensating devices for short) are formed by a base element or body and an axial compensating element, for example metallic threaded sleeves, which are in a thread engagement, for example a left-hand thread engagement. A spring element is usually arranged in the axial compensating element, and creates a frictional connection between a connecting element that is passed through the compensating device and has a further thread (right-hand thread) and the axial compensating element, so that when the connecting element is tightened, for example rotated, a torque is exerted on the axial compensating element, which causes axial unscrewing of the compensating element from the base element against the insertion direction of the connecting screw and thus compensates for axial tolerances.

SUMMARY

The object of the invention is to specify a particularly simply constructed device for compensating for tolerances between two components to be connected to one another.

The object is achieved according to the invention by a device with the features of the claims for compensating for tolerances between two components to be connected.

Further developments of the invention are the subject matter of the dependent claims.

The device according to the invention for compensating for tolerances between two components to be connected to one another comprises at least one hollow cylindrical base element, a hollow cylindrical compensating element which is in thread engagement with the basic element and which can be moved from an initial position into a compensating position by rotating it relative to the base element, and a connecting element extending through a cavity of the compensating element for connecting the two components, wherein the cavity has an inner contour in cross section and the connecting element has an outer contour in cross section, and wherein the inner contour differs from the outer contour in such a way that when the inner contour and the outer contour are oriented concentrically at least one radial overhang is present.

In particular, the configuration with at least one radial overhang enables a targeted force fit between the connecting element and the compensating element, at least in some portions. As a result, at least a portion of the connecting element, for example a connecting screw or a threaded bolt, can be used to maintain a distance between the components to be connected. As a result, a spring-free design of the device is made possible in comparison to conventional compensating devices. In other words: A separate spring element as a driver for unscrewing the compensating element can be dispensed with.

Another device according to the invention for compensating for tolerances between two components to be connected to one another comprises at least one hollow cylindrical base element, a hollow cylindrical compensating element which is in thread engagement with the base element and which can be moved from an initial position into a compensating position by rotating it relative to the base element, and a connecting element extending through a cavity of the compensating element for connecting the two components, wherein the cavity has an inner contour in cross section and the connecting element has an outer contour in cross section, and wherein the inner contour or the outer contour has at least one radially extending bulge in cross section and wherein, with a concentric orientation of the inner contour and the outer contour, at least one radial overhang and/or an integrated driver, in particular an integrated driver portion, is formed by the at least one bulge of the outer contour or inner contour in the cross section of the compensating element.

In the device according to the invention, the integrated driver is formed by means of the bulge through frictional contact and/or the radial overhang is formed by form-fitting contact. For example, the bulge is formed by a non-circular inner contour or a non-circular outer contour. The interaction of the inner contour and the outer contour by means of the bulge results in at least a force fit directly between the connecting element and the compensating element, as a result of which the torque of the connecting element is transmitted to and exerted on the compensating element. The number of components of the device according to the invention is thus reduced. The device according to the invention is constructed in a particularly simple manner from a few parts and is inexpensive to manufacture. The tolerance compensation between the two components to be connected to one another takes place with high accuracy and only little effort.

For example, the bulge of the inner contour or the outer contour is formed in the shape of a partial circle or a segment of a circle or as a spherical bulge. The compensating element is preferably designed in one piece, in particular without an additional driver or an additional spring element. For example, the device can be spring-free. Instead of a separate driver, the at least one bulge of the compensating element or of the connecting element forms the radial overhang and/or the integrated driver, in particular the integrated driver portion.

A further development provides that if the inner contour is not circular, the outer contour is circular. Alternatively, the inner contour can be circular and the outer contour can be non-circular. For example, the cross section of the inner contour is oval, elliptical or trilobular, in particular triangular or quadrangular, and the outer contour is circular, in particular round, or vice versa. Such a contour and countercontour of the compensating element and connecting element enables a particularly effective force fit and/or form fit and thus a driving engagement in a simple manner without additional means. Due to the double or multiple, in particular triple or quadruple, radial overhang and/or integrated driver portion between the inner and outer contour, the individual radial overhang or the individual integrated driver portion can be designed to be as small as possible in order to achieve a sufficient force fit or form fit, in particular self-locking, between the contours. The inner contour and the outer contour are designed to correspond to one another in such a way that, despite self-locking between the contours, a desired adjustment of the position of the compensating element relative to the base element and thus tolerance compensation between the components and setting of the position of one component relative to the other component is still possible.

In addition, the inner contour of the compensating element can have a conical shape. As a result, a secure force fit between the connecting element and the compensating element is made possible in some portions. The diameter of the conical shape of the compensating element decreases in the insertion direction of the connecting element. On the other hand, the force fit in the region of the conical shape between the connecting element and the compensating element increases in the insertion direction of the connecting element and along a longitudinal extent of the connecting element.

In one possible embodiment, the inner contour and the outer contour are designed in such a way that they come into frictional engagement with one another, in particular a driver engagement, at least when the device is assembled. In particular, the compensating element and the connecting element come into frictional engagement with one another in such a way that, in particular when the device is assembled and the two components are connected to one another, a torque exerted by the connecting element can be transmitted to the compensating element. As a result, unwanted distances between the two components to be connected can be compensated.

The base element and the compensating element can each be formed from a plastics material. Alternatively, other materials such as metals can also be provided. The base element and the compensating element can be formed from the same material or from different materials.

Depending on the size of the radial overhang, the inner contour and the outer contour can also come into a form fit with one another. The greater the radial overhang, the more likely it is that, beyond the frictional fit, the inner contour and the outer contour will come into a form fit with one another.

In addition, the inner contour, in particular including the bulge thereof, and/or the outer contour, in particular including the bulge thereof, can be provided with an engagement structure. For example, the inner contour and/or the outer contour can be provided with a friction layer, for example a fine-grained or coarse-grained top layer. This increases the force fit between the connecting element and the compensating element.

The compensating element and/or the connecting element can also be at least partially deformable. Due to the small radial overhang, particularly in some portions, and/or the at least one bulge between the inner contour and the outer contour, deformation of the compensating element and/or of the connecting element, in particular slight expansion and/or compression, can occur in the assembled state of the device.

In addition, the compensating element and the base element surround the connecting element coaxially. The compensating element and the base element have a longitudinal extent, which is an extent along a longitudinal axis. The compensating element and the base element are in particular designed to be rotationally symmetrical about their longitudinal axes. In the assembled state of the device, the longitudinal axes of the compensating element, the base element and the connecting element coincide. In addition, the compensating element for tolerance compensation is arranged in the base element so that it can move axially.

DESCRIPTION OF THE FIGURES

Embodiments of the invention are explained in greater detail with reference to the drawings, in which.

DETAILED DESCRIPTION

Parts which correspond to one another are provided with the same reference signs in all figures.

Figure 1A:
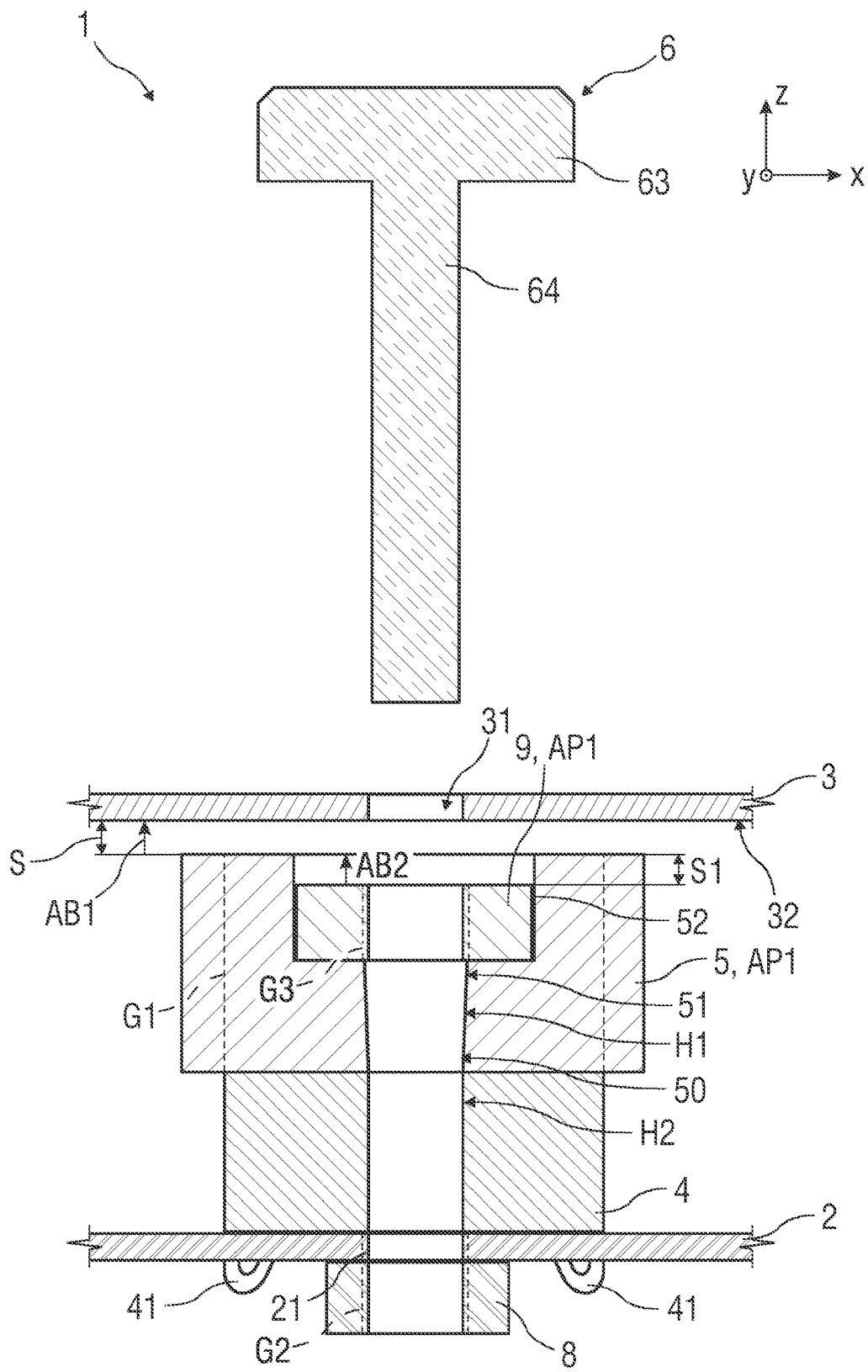
FIG. 1A is a schematic representation of an embodiment of a device for compensating for tolerances between two components in an initial position with a height gap to be compensated for between the components or in a compensating position with a compensated height gap and compensated synchronization height.

FIG. 1A is a schematic representation of a first embodiment of a device 1 for compensating for, in particular axial, tolerances, in particular a height gap S, between two components to be connected to one another. The device 1 is provided, for example, for attaching a first component 2, for example a bearing clip, an electronic part, a lamp, a decorative part, to a second component 3, for example a door panel, a support structure or a body structure of a vehicle.

The device 1 comprises at least one hollow cylindrical base element 4 and one hollow cylindrical compensating element 5. The hollow cylindrical base element 4 is designed as a retaining element for the first component 2. For this purpose, the first component 2 has at least one or more recess(es), not shown in detail. The base element 4 comprises at least one or more flexible retaining lug(s) 41 which pass through the recesses and strike and retain an underside of the first component 2.

The device 1 also includes a connecting element 6 which extends at least through a first cavity H1 of the device 1 in order to connect the first component 2 and the second component 3 to one another.

The first cavity H1 has an inner contour 51 in cross section. The connecting element 6 has an outer contour 61 in cross section.

The first cavity H1 is formed by the hollow interior of the compensating element 5. The inner contour 51 is formed on the inner wall of the compensating element 5.

In addition, the connecting element 6 extends through a second cavity H2 formed by the hollow interior of the base element 4.

Figure 4:
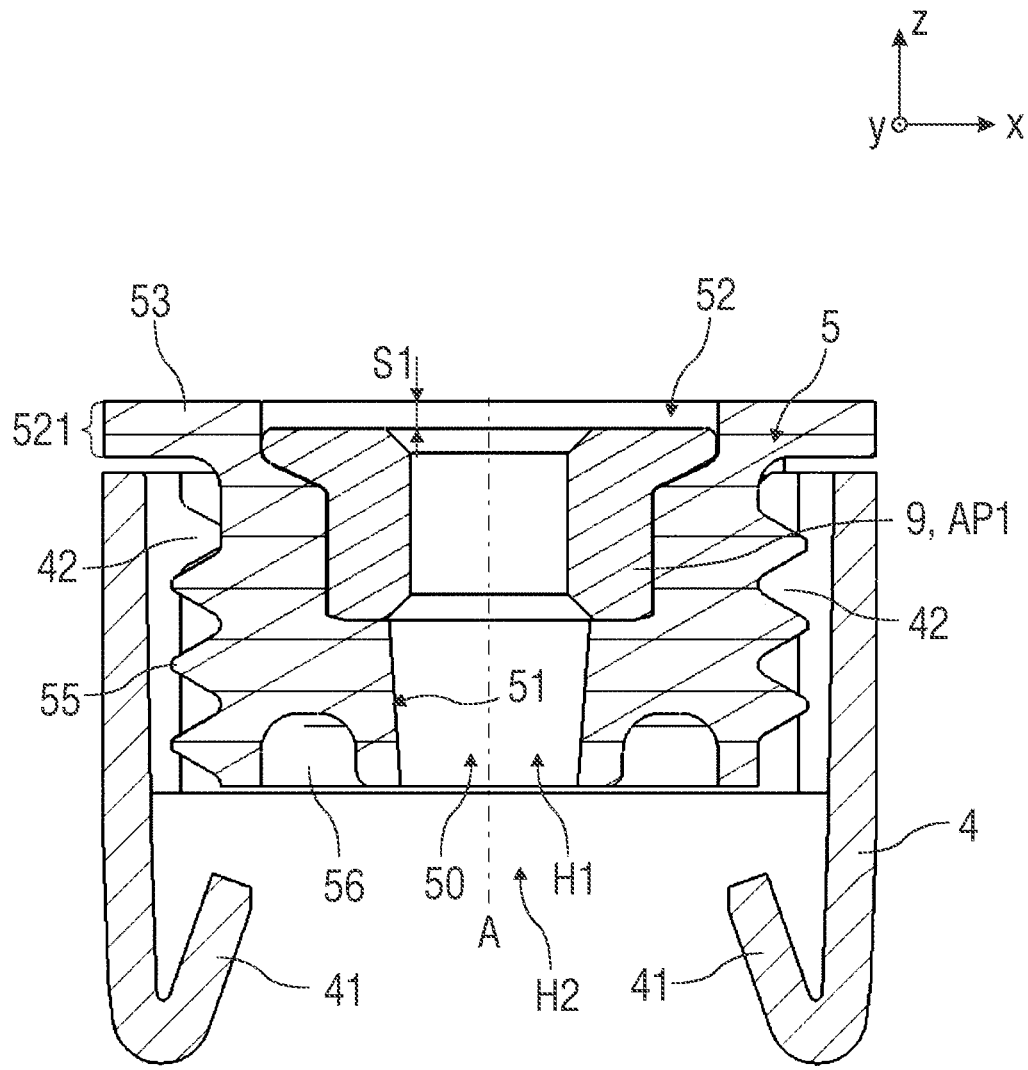
FIG. 4 is a sectional view of an embodiment for the device without a connecting element.

In the embodiment, the base element 4 is arranged coaxially in the compensating element 5. Alternatively, the compensating element 5 can be arranged coaxially in the base element 4, as is shown in FIG. 4.

The inner contour 51 (as shown in FIG. 2A to 2D) has, in cross section, at least one bulge 511 which extends radially outwards and in particular protrudes from the inner circumference. The inner contour 51 preferably has a plurality of bulges 511 distributed uniformly around the inner circumference of the compensating element 5.

Figure 2A:
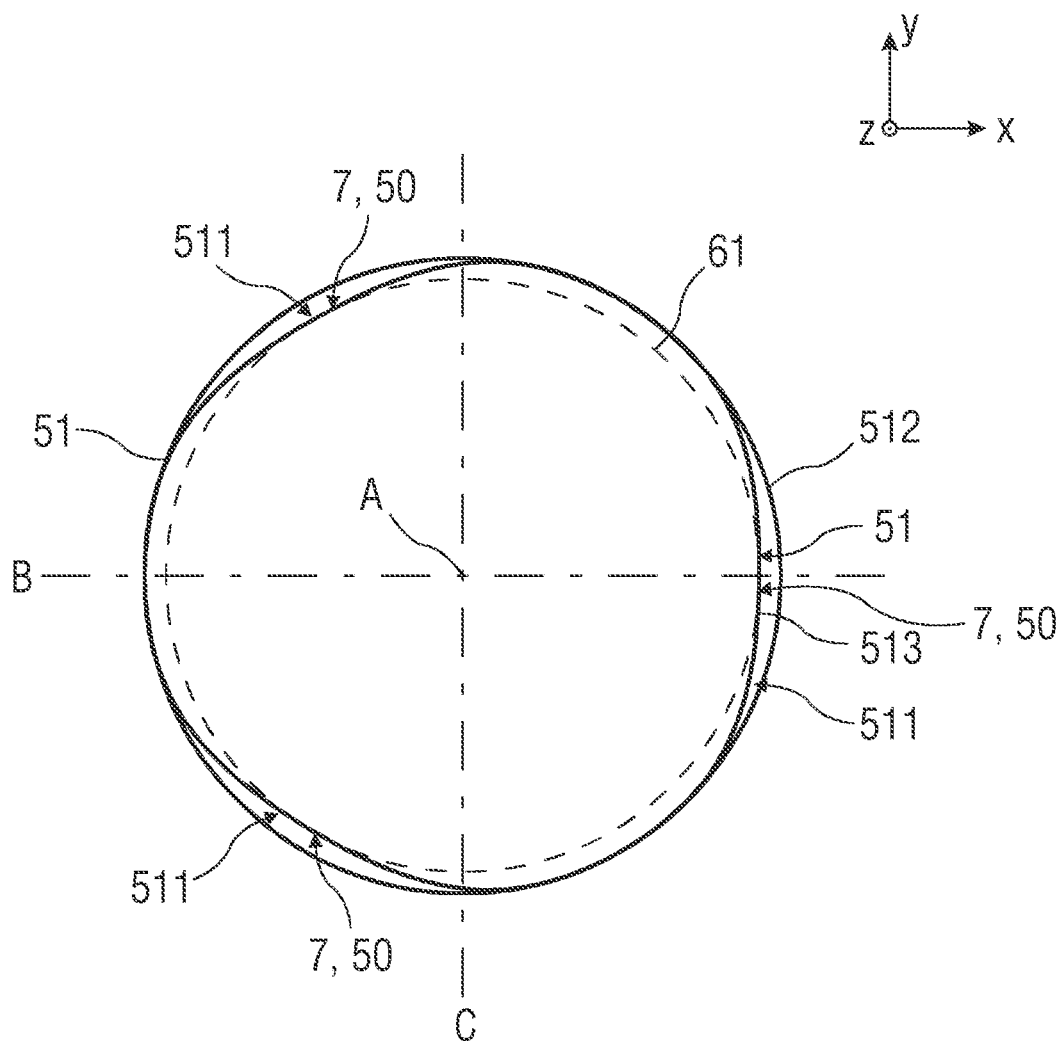
FIG. 2A shows a schematic representation of a first embodiment for an inner contour of a compensating element and an outer contour of a connecting element.
Figure 2B:
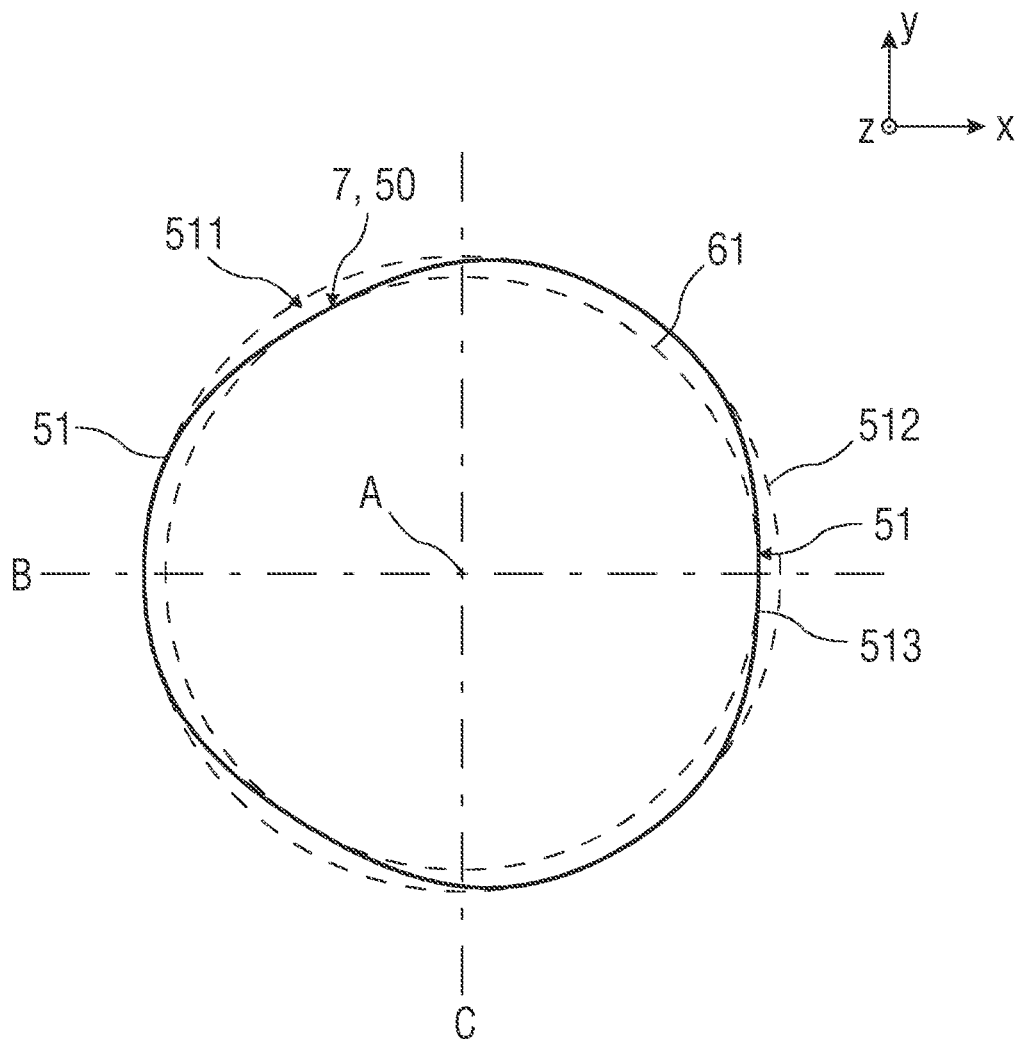
FIG. 2B shows a schematic representation of a first embodiment for an inner contour of a compensating element and an outer contour of a connecting element.
Figure 2C:
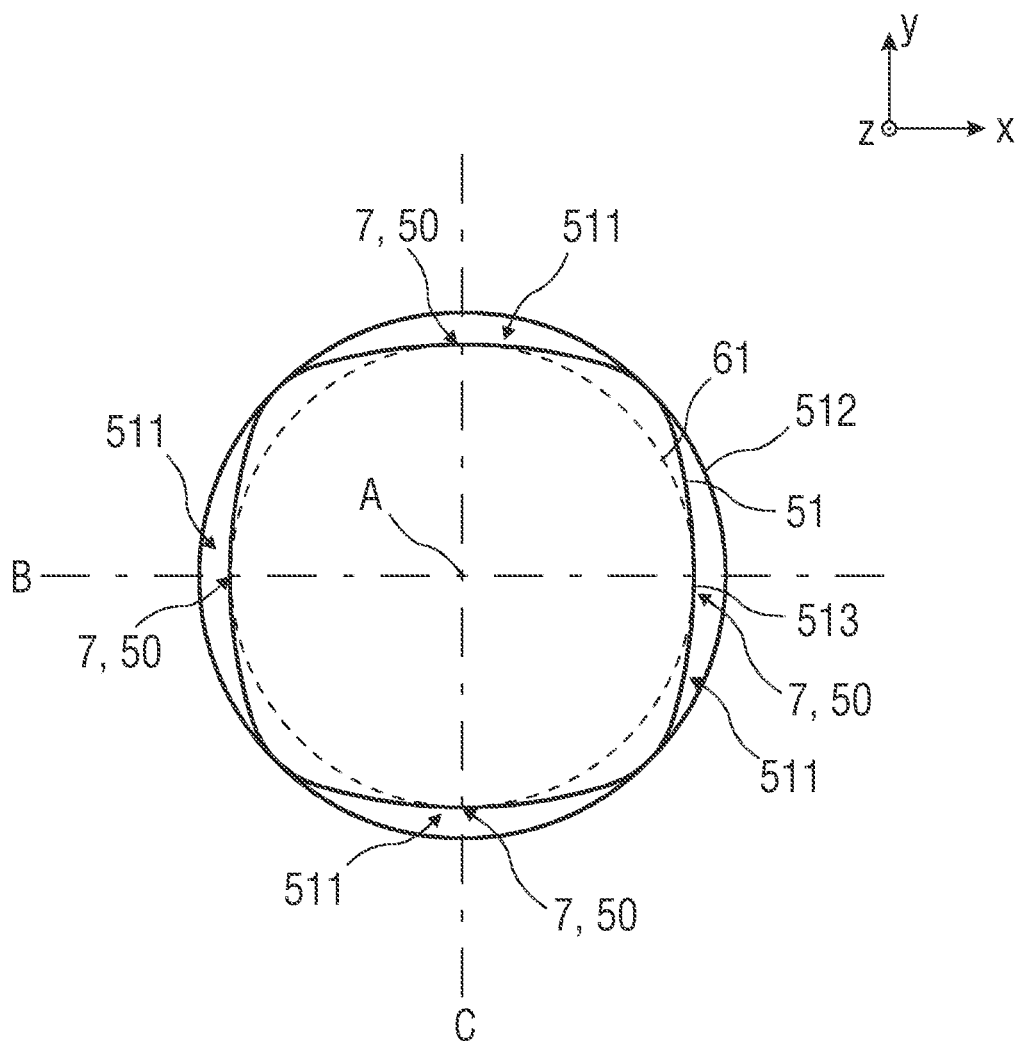
FIG. 2C shows a schematic representation of a second embodiment for an inner contour of a compensating element and an outer contour of a connecting element.
Figure 2D:
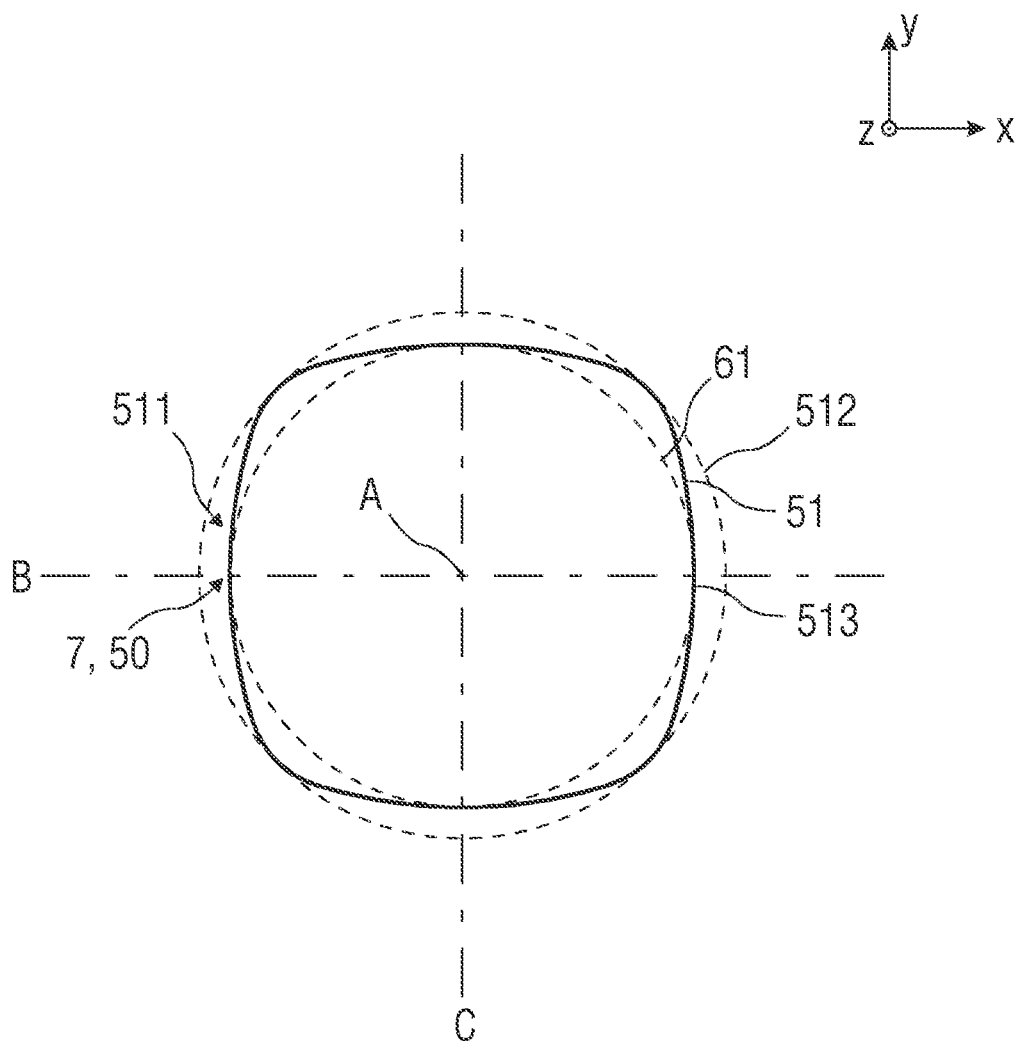
FIG. 2D shows a schematic representation of a second embodiment for an inner contour of a compensating element and an outer contour of a connecting element.
Figure 2E:
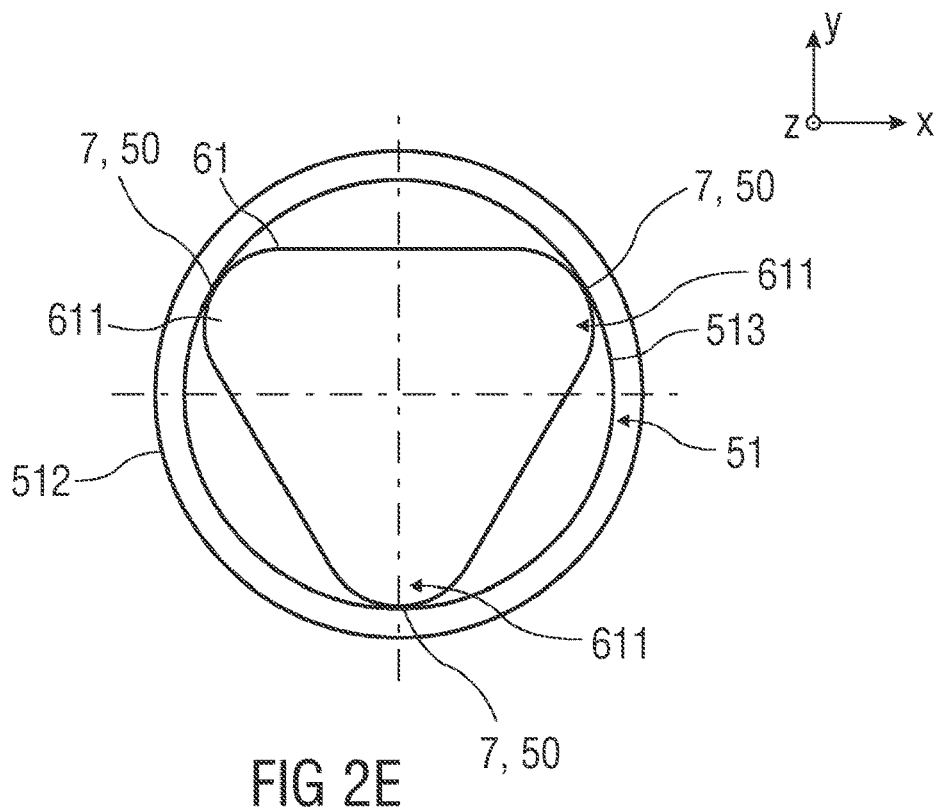
FIG. 2E shows a schematic representation of a third embodiment for an inner contour of a compensating element and an outer contour of a connecting element.
Figure 2F:
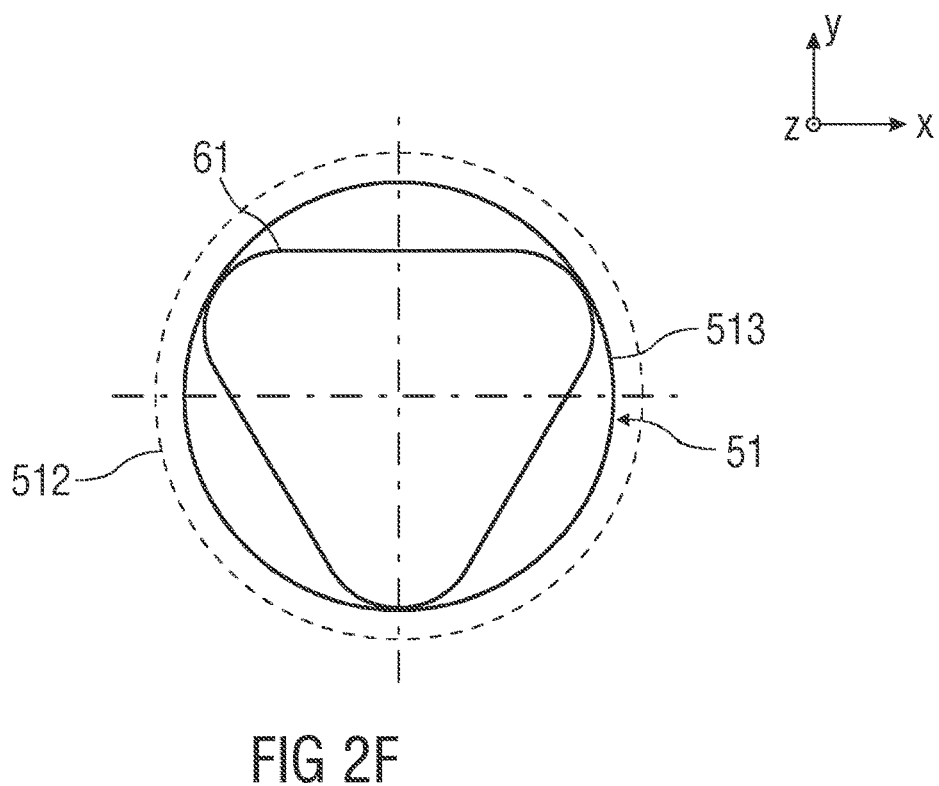
FIG. 2F shows a schematic representation of a third embodiment for an inner contour of a compensating element and an outer contour of a connecting element, FIG. 3A respectively shows an embodiment for a compensating element in plan view and in perspective view, FIG. 3B respectively shows an embodiment for a compensating element in plan view and in perspective view.

In an alternative embodiment of the device 1, instead of the bulge 511 on the inner contour 51 of the compensating element 5, at least one or more bulge(s) 611 can be provided on the outer contour 61 of the connecting element 6, as shown in FIG. 2E, 2F.

When the inner contour 51 of the compensating element 5 and the outer contour 61 of the connecting element 6 are oriented concentrically, in the cross section through the at least one bulge 511 of the inner contour 51 (FIG. 2A to 2D) or the at least one bulge 611 of the connecting element 6 (FIGS. 2E and 2F) there is a radial overhang 7 and/or an integrated driver 50, in particular an integrated driver portion.

FIG. 2A shows a first embodiment of the inner contour 51 and the outer contour 61 in a plan view from below. The outer contour 61 of the connecting element 6 is circular, in particular round. The inner contour 51 of the compensating element 5 according to FIG. 2A has three bulges 511 which are arranged, in particular, uniformly distributed on the inner circumference of the compensating element 5. FIG. 2B shows the inner contour 51 and the outer contour 61 according to FIG. 2A in a plan view from above.

FIG. 2C shows a second embodiment of the inner contour 51 and the outer contour 61 in a plan view from below. The outer contour 61 is circular, in particular round. The inner contour 51 according to FIG. 2C has four bulges 511 which are arranged, in particular, uniformly distributed on the inner circumference of the compensating element 5. FIG. 2D shows the inner contour 51 and the outer contour 61 according to FIG. 2C in a plan view from above.

FIG. 2E shows a third embodiment for the inner contour 51 and the outer contour 61 in a plan view from below. The inner contour 51 is circular, in particular round. The outer contour 61 according to FIG. 2E has three bulges 611 which are arranged, in particular, uniformly distributed on the outer circumference of the connecting element 6. FIG. 2F shows the inner contour 51 and the outer contour 61 according to FIG. 2C in a plan view from above.

Figure 7A:
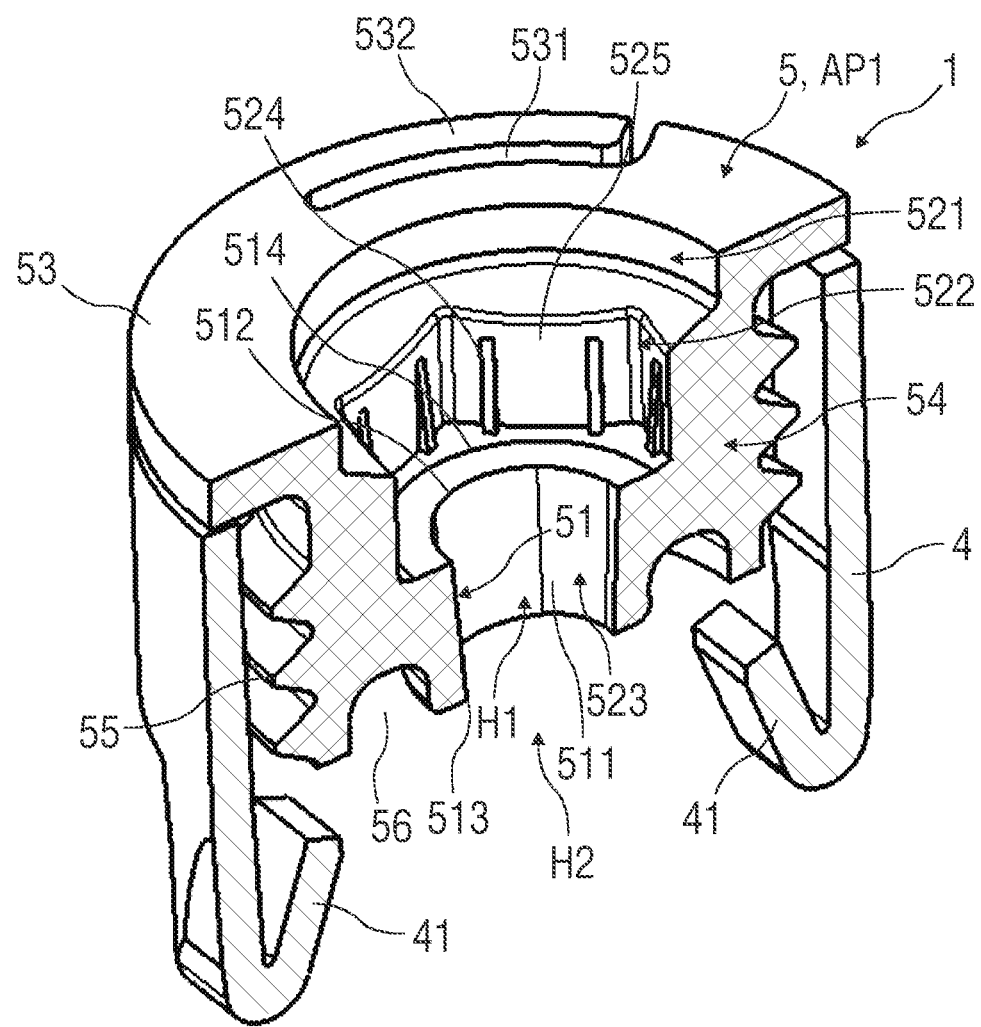
FIG. 7A is a partially sectional view of the device in the assembled state without a connecting element and without a second nut element, wherein the compensating element is placed in an initial position.
Figure 8A:
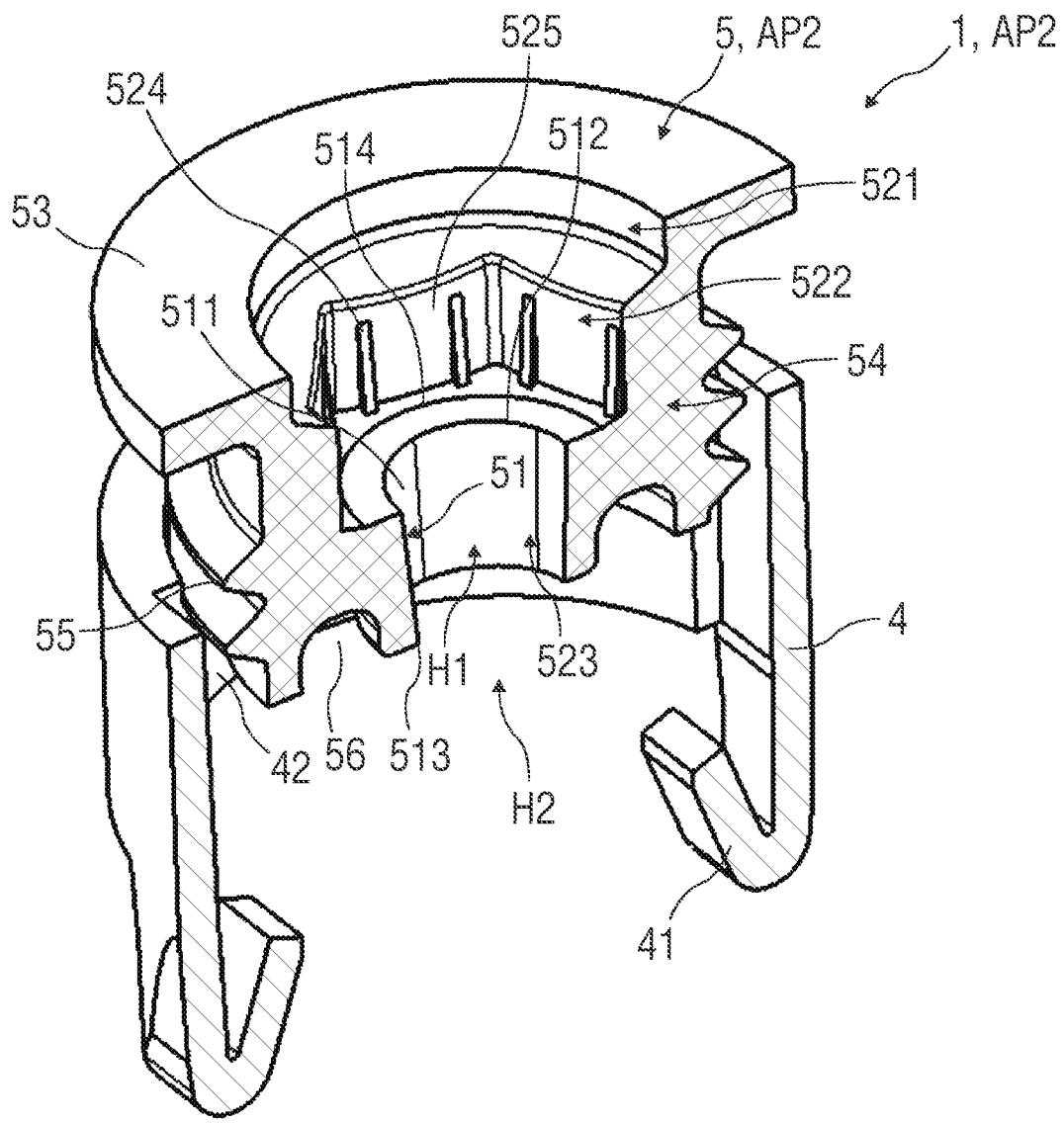
FIG. 8A is a partially sectional view of the device in the assembled state without a connecting element and without a second nut element, wherein the compensating element is placed in a compensating position.

The inner contour 51 of the compensating element 5 is cylindrical for all embodiments. In particular, the particular inner contour 51 of the various embodiments is conical or frustoconical with a first radius 512 and a second radius 513 in longitudinal section. The first radius 512 is greater than the second radius 513, as shown in FIGS. 7A and 8A.

The first radius 512 is circular, for example. The second radius 513 is, for example, triangular or trilobular, as shown in FIGS. 2A and 2B, or quadrangular, as shown in FIGS. 2C and 2D. The bulges 511 on the inner circumference of the compensating element 5 or the bulges 611 of the connecting element 6 extend in the longitudinal extent of the compensating element 5 and the connecting element 6, in particular over a compensating portion 523 shown in FIG. 3B.

The specific bulge 511 or 611 can be designed in the form of a part of a circle or a segment of a circle or as a spherical bulge. If several bulges 511 or 611 are provided, they all have the same shape.

The compensating element 5 is designed in one piece. The compensating element 5 is spring-free. The compensating element 5 has no spring elements.

In the embodiment shown, the inner contour 51 differs from the outer contour 61 in such a way that when the inner contour 51 and the outer contour 61 are oriented concentrically to one another, the at least one radial overhang 7 is present, as is shown in the various embodiments in FIG. 2A to 2E.

Such a configuration of the contours with at least one radial overhang 7 and/or integrated driver 50, in particular integrated driver portion, enables a targeted force fit between the connecting element 6 and the compensating element 5 at least in some portions. As a result, at least a portion of the connecting element 6 can be used to maintain a distance between the components 2, 3 to be connected. As a result, a spring-free design of the device is made possible in comparison to conventional compensating devices. The integrated driver 50 on the compensating element 5 is formed in the device 1 by a corresponding configuration of the inner contour 51, in particular a non-circular inner contour 51, and a circular outer contour 61 or vice versa. In particular, the interaction of the inner contour 51 and the outer contour 61 results in a force fit and/or form fit, so that the torque of the connecting element 6 is transmitted to and exerted on the compensating element 5. In addition, the number of components of the device according to the invention is reduced.

FIG. 1A shows the device 1 in a partially assembled state in an initial position AP1, in which the compensating element 5 is arranged at a distance corresponding to a height gap S from the second component 3.

Figure 1B:
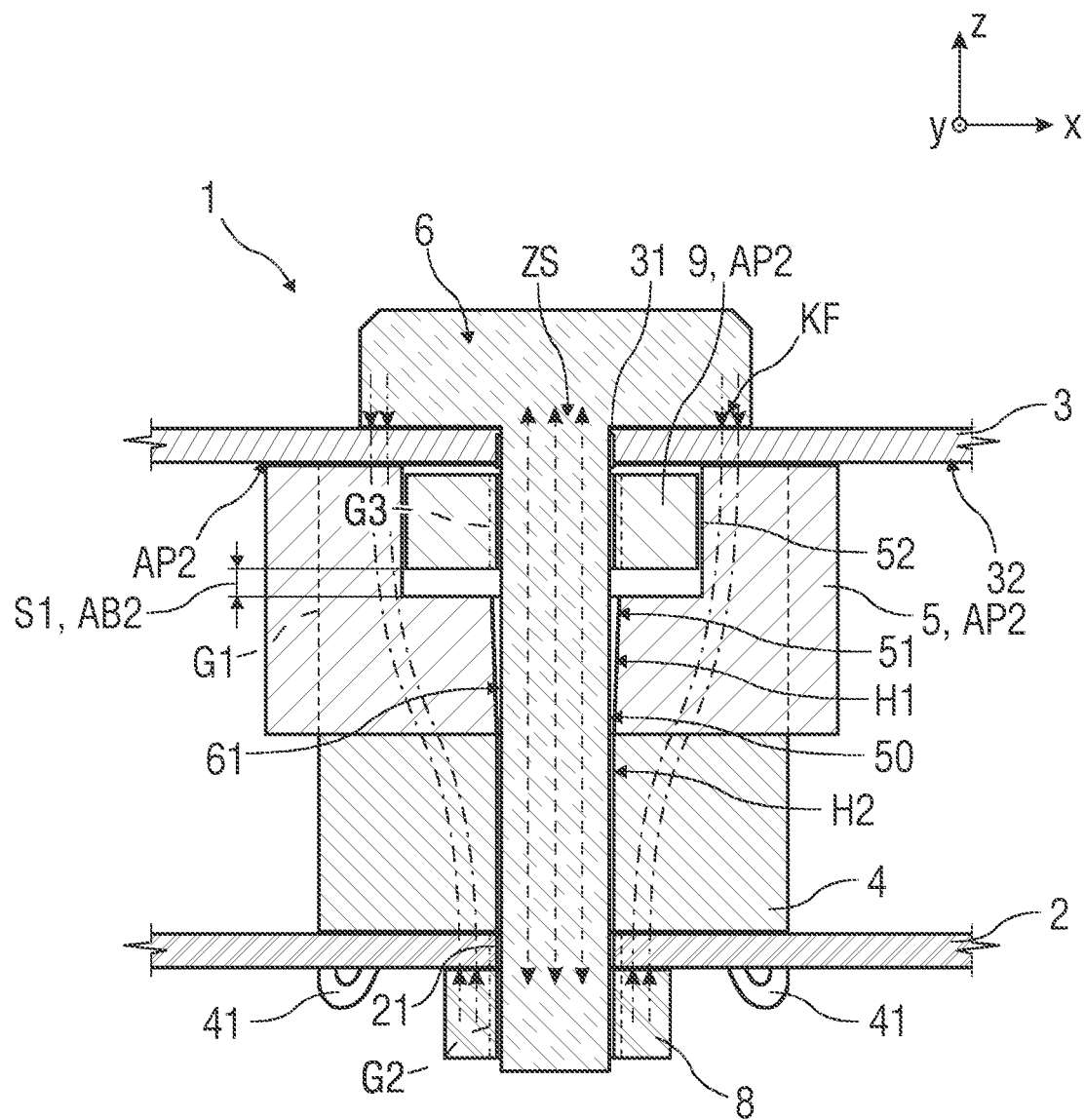
FIG. 1B is a schematic representation of an embodiment of a device for compensating for tolerances between two components in an initial position with a height gap to be compensated for between the components or in a compensating position with a compensated height gap and compensated synchronization height.

At least when the device 1 is assembled, the compensating element 5 comes into a first thread engagement G1 with the base element 4, wherein the compensating element 5 can be moved by rotating it relative to the base element 4 from the initial position AP1 into a compensating position AP2 to compensate for the height gap S in a first compensating movement AB1, as illustrated by the sequence of FIGS. 1A and 1B.

FIG. 1B shows the device 1 in the compensating position AP2, in which the height gap S is compensated for and the two components 2 and 3 are connected to one another by means of a connecting element 6, in particular by means of a clamp connection.

The connecting element 6 is a connecting screw, for example, which extends at least through a first cavity H1 and a second cavity H2 of the device 1 in order to connect the first component 2 and the second component 3 to one another.

When the device 1 is assembled, the connecting element 6 comes into a second thread engagement G2 with one of the components 2, 3 and/or a first nut element 8, in particular for connecting, in particular clamping, the two components 2 and 3 to one another.

A second nut element 9 is provided for synchronization of the first thread engagement G1 and the second thread engagement G2 when the device 1 is assembled. The second nut element 9 is arranged in the compensating element 5 in such a way that it is moved in the compensating element 5 at least in some portions independently of the compensating element 5 and relative to it axially, in particular in accordance with a second compensating movement AB2, as is described in more detail below.

The assembly takes place as follows:

The base element 4 and the compensating element 5 are arranged together in the screwed state on the first component 2, in particular clipped, for example connected to the first component 2 by means of retaining lugs 41. The second nut element 9 is arranged in a rotationally fixed manner in a receptacle 52, in particular in a receptacle portion 522, of the compensating element 5.

The second component 3 is arranged with a through-opening 31 concentrically with the opening of the receptacle 52.

The connecting element 6, in particular a screw with a screw head 63 and a threaded shank 64, is inserted, in particular screwed, through the through-opening 31 in the second component 3 into the second nut element 9. The second nut element 9 is arranged in a rotationally fixed manner in the compensating element 5.

The connecting element 6 is then inserted further into the compensating element 5 and comes into contact with a non-circular inner contour 51, in particular with the bulges 511, of the compensating element 5, as shown in the examples according to FIG. 2A to 2D. Alternatively, as shown for example in FIG. 2E, 2F, the connecting element 6 can have a non-circular outer contour 61, in particular with the bulges 611, and the inner contour 51 can be circular. Alternatively, instead of the non-circular inner contour 51, a conventional driver element (not shown in detail), in particular a spring element, can be arranged in the compensating element 5.

This results in a first compensating movement AB1, in that the compensating element 5 is brought into contact with the second component 3 by the entrainment of the non-circular inner contour 51 or the spring element by the connecting element 6, as shown in FIG. 1B. In other words: The connecting element 6 and the compensating element 5 come into driving engagement through the integrated driver 50 and/or the radial overhang 7 for the first, in particular axial, compensating movement AB1. The compensating element 5 moves counter to the insertion direction of the connecting element 6 and relative to the base element 4. This first compensating movement AB1 in the axial direction serves to compensate for axial tolerances between the two components 2 and 3. The maximum length of the first compensating movement AB1 corresponds approximately to the height gap S.

Figure 1C:
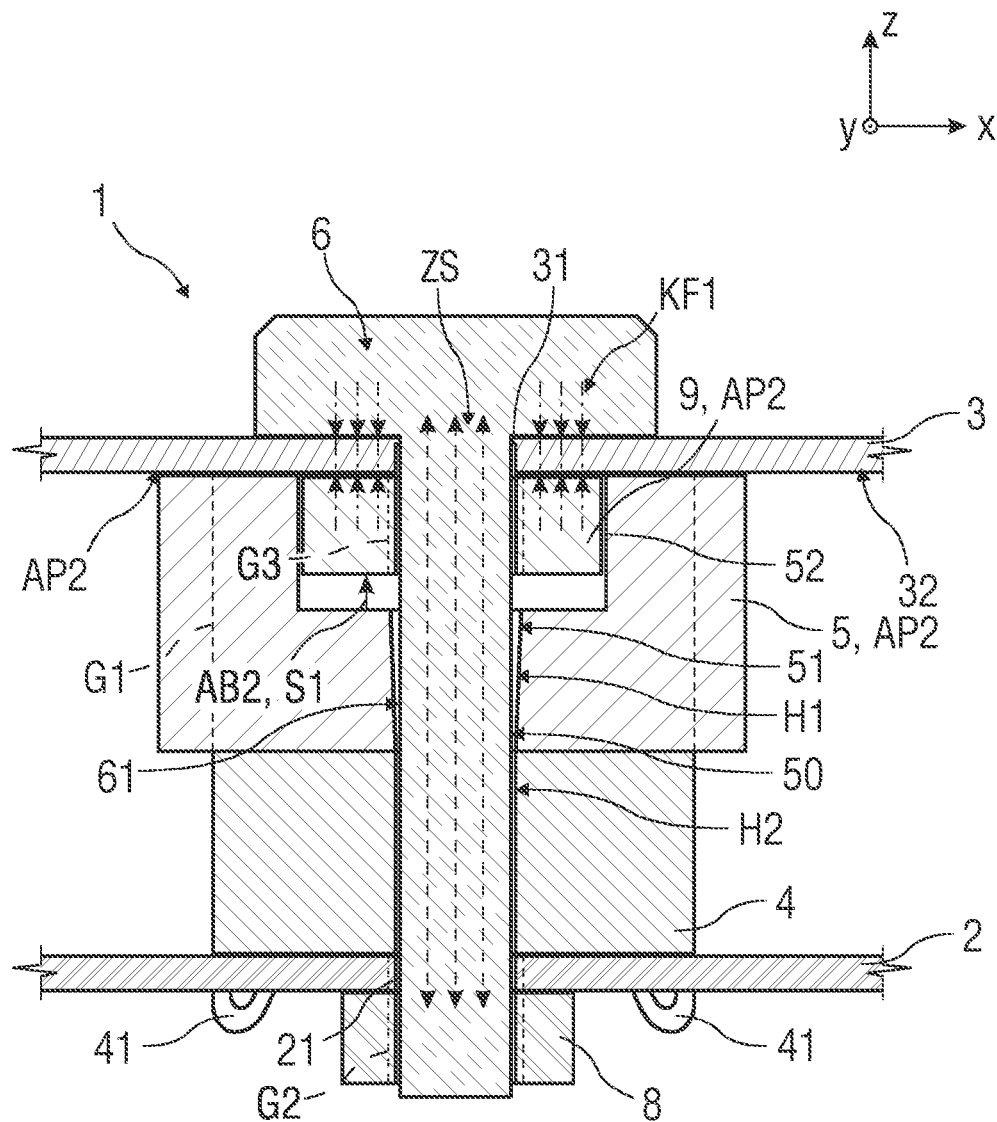
FIG. 1C is a schematic representation of an embodiment of a device for compensating for tolerances between two components in an initial position with a height gap to be compensated for between the components or in a compensating position with a compensated height gap and compensated synchronization height.

The connecting element 6 comes into frictional engagement with the inner contour 51 of the compensating element 5 through the integrated driver 50 and/or the radial overhang 7. As a result of the frictional engagement, the connecting element 6 transmits a torque to the compensating element 5, so that the compensating element 5 moves in the opposite direction to the insertion direction of the connecting element 6 and relative to the second nut element 9 and to the base element 4 axially in the direction of the second structural element 3 according to the first compensating movement AB 1 until the compensating element 5 strikes the underside 32 of the second component 3, as shown in FIG. 1B or 1C. This position corresponds to the compensating position AP2. This movement of the compensating element 5 when the connecting element 6 is screwed into the device 1 represents the first compensating movement AB1, in which the compensating element 5 is moved axially in the direction of the second component 3 relative to the base element 4 and to the components 2 and 3. As a result, axial tolerances between the components 2 and 3 are compensated for.

The second nut element 9 is arranged in the compensating element 5 in such a way that it can be entrained during this first compensating movement AB1 of the compensating element 5. In other words: During this first compensating movement AB1 of the compensating element 5, the second nut element 9 has moved relative to the base element 4 and the components 2 and 3, but not axially relative to the compensating element 5. Alternatively, the second nut element 9 can be arranged in a recess 52 in the compensating element 5 so that it can move axially up and down, so that the compensating element 5 does not necessarily entrain the second nut element 9.

As the connecting element 6 is inserted further into the device 1, it may happen that the thread of the connecting element 6 cannot directly engage in the thread of the first nut element 8 or strikes it.

In order to synchronize the two threads, therefore, as a result of the thread engagement between the second nut element 9 and the connecting element 6, the second nut element 9 is moved axially relative to the compensating element 5 and, independently of this, according to the second compensating movement AB2. The second nut element 9 is moved axially, independently of the compensating element 5, counter to the insertion direction of the connecting element 6 until the thread of the connecting element 6 engages in the thread of the first nut element 8. The maximum length of the second compensating movement AB2 corresponds approximately to a synchronization height S1.

For synchronization of the thread starts of the second thread engagement G2, a torque is exerted on the second nut element 9 as a result of the third thread engagement G3 between the connecting element 6 and the second nut element 9, which torque overcomes the form fit on the longitudinal webs 524, so that the second nut element 9 is rotated axially in or out of the receptacle portion 522 counter to the insertion direction of the connecting element 6. In particular, the second nut element 9 is rotated axially in the direction of the flange surface and independently of the compensating element 5 and base element 4 in the receptacle portion 522 or at least partially out of it. In particular, the second nut element 9 is moved axially in the receptacle portion 522 until the thread of the connecting element 6 engages or maneuvers into the thread of the first nut element 8. This movement serves to synchronize the threads of the second thread engagement G2 and represents the second compensating movement AB2.

Depending on the arrangement of the threads in relation to one another, the synchronization length can, under certain circumstances, amount to a rotation of up to 360° until the threads engage. This synchronization length according to the second compensating movement AB2 has a corresponding adjustable synchronization height S1 of the second nut element 9. One revolution can be approximately one thread pitch, for example. This one thread pitch can in turn correspond approximately to the synchronization height S1 and/or the height gap S.

However, it may also be the case that the second compensating movement AB2 does not completely compensate for the height gap S because, for example, only half a thread pitch is necessary so that the connecting element 6 can be threaded into the first nut element 8, and in particular the threads thereof engage in one another. In this case, the synchronization height S1 is less than the height gap S, as shown in FIG. 1B.

In this case, if only the compensating element 5 is braced against the second component 3 by means of the connecting element 6, a corresponding flux of force KF of a compressive stress runs between the connecting element 6 and the first nut element 8 via the compensating element 5 and the base element 4.

In addition, the torque of the fastening process of the two components 2 and 3 can under certain circumstances result in a flux of force KF1 of a compressive stress that is changed by comparison with conventional clamp connections, in particular a clamp connection (also referred to as clamping) between the connecting element 6 and the second nut element 9, in particular between the screw head 63 and the second nut element 9. When the device 1 is in the assembled state, the connecting element 6 is subjected to a tensile stress ZS.

This changed flux of force KF1 is shown in FIG. 1C.

During the second compensating movement AB2, the second nut element 9 comes into contact with the second component 3, so that the tensile force of the connecting element 6 braces the second nut element 9 with the second component 3 and fixes them to one another.

Alternatively or additionally, a type of setting behavior between the base element 4 and the compensating element 5 can already occur during assembly and thus during the screwing-in process or later in the assembled state, if the parts are made of plastics material, for example, so that the changed flux of force KF1 is always set in the device 1.

In the case of the changed flux of force KF1 between the connecting element 6 and the second nut element 9 in the assembled state of the device 1, a clamping load or tension between the other components, in particular a tension between compensating element 5 and the base element 4, is avoided.

The second nut element 9 is arranged in the recess 52 of the compensating element 5 in such a way that when the connecting element 6 is screwed into the device 1, this second nut element 9 comes into a third thread engagement G3 with the connecting element 6, with the result that, when the connecting element 6 is screwed into the first component 2 and/or the first nut element 8, the second nut element 9 is moved axially, at least in some portions, independently of the compensating element 5 and relative thereto, as has been described in detail above.

Thus, in the assembled state of the device 1 the compensating element 5 and the base element 4 are outside the changed flux of force KF1 of the second nut element 9 with the connecting element 6. Due to the force fit of the connecting element 6 with the second nut element 9 via the third thread engagement G3, the second nut element 9 is moved axially in the device 1 without the compensating element 5, which enables simple synchronization of the subsequent first and second thread engagements G1 and G2.

According to the invention, the inner contour 51 differs from the outer contour 61 in such a way that when the inner contour 51 and the outer contour 61 are oriented concentrically to one another by means of the bulges 511 or 611, radial overhangs 7 and/or integrated drivers 50 are formed, as is shown in FIG. 2A to 2E.

Such a configuration of the contours with at least one radial overhang 7 and/or with at least one integrated driver 50 enables a targeted force fit between the connecting element 6 and the compensating element 5, at least in some portions. As a result, at least a portion of the connecting element 6 can be used to maintain a distance between the components 2, 3 to be connected. As a result, a spring-free design of the device is made possible in comparison to conventional compensating devices. The radial overhang 7 and/or the integrated driver 50 on the compensating element 5 is formed in the device 1 by a corresponding configuration of the inner contour 51, in particular a non-circular inner contour 51. In particular, the interaction of the inner contour 51 and the outer contour 61 results in a force fit, as a result of which the torque of the connecting element 6 is transmitted to and exerted on the compensating element 5. In addition, the number of components of the device 1 according to the invention is reduced.

FIGS. 2A and 2B each show a simplified schematic representation in cross section of the inner contour 51 of the compensating element 5 and the outer contour 61 of the connecting element 6. The inner contour 51 shown in FIG. 2A or 2B and the outer contour 61 lie in a plane that is spanned by two axes B and C, wherein the axis B and the axis C are oriented perpendicular to one another and perpendicular to the longitudinal axis A of the device 1. The longitudinal axis A runs through the intersection of the two axes B and C.

The respective inner contour 51 is substantially non-circular. The particular outer contour 61 is substantially circular. In the embodiment, the inner contour 51 is trilobular and has three round corners, also referred to as a round triangle. Alternatively, the inner contour 51 can be oval or elliptical, wherein only two radial overhangs 7 are then formed instead of three radial overhangs 7 and/or integrated drivers 50. The inner contour 51 can also be designed in such a way that four radial overhangs 7 and/or integrated drivers 50 are formed, as shown in FIG. 2B. Such an inner contour 51 is also referred to as a round square.

Alternatively, the outer contour 61 can be non-circular and the inner contour 51 can be substantially circular, as shown in FIGS. 2E and 2F.

A first nut element 8 is provided on the underside of the first component 2 for connecting the two components 2 and 3. The first nut element 8 can be a separate element.

Alternatively, the first nut element 8 can be welded onto the first component 2. The first component 2 and the second component 3 each comprise associated through-openings 21 and 31 for the connecting element 6. In a further alternative embodiment, the first component 2 itself can have an internal thread as a nut, wherein the internal thread is formed in the associated through-opening 21.

To assemble the device 1, the first component 2 and the second component 3 are screwed to one another. In this case, for example, the device 1 is arranged on the first component 2, for example by means of the base element 4, and is held there, for example by means of the retaining lugs 41. The second component 3 is arranged on the side of the compensating element 5 facing away from the base element 4. The connecting element 6 is then passed through the through-opening 31 in the second component 3, the first cavity H1 and the second cavity H2 and the through-opening 21 in the first component 2 and is screwed into the first component 2 and/or the first nut element 8.

The compensating element 5 and the connecting element 6 come into frictional engagement with one another at least in some portions, in particular in the area of the inner contour 51 and the outer contour 61. The compensating element 5 and the connecting element 6 thus come into frictional engagement with one another in such a way that, when the two components 2 and 3 are connected to one another, a torque exerted by the connecting element 6 can be transmitted to the compensating element 5. By screwing the components 2 and 3 to one another, the undesired height gap S between the two components 2 and 3 to be connected is compensated for and closed by the compensating element 5 being moved axially from an initial position AP1 into the compensating position AP2 according to the arrow PF1 during the screwing process. In the initial position AP1, the compensating element 5 is arranged at a distance according to the height gap S from an underside 32 of the second component 3, as shown in FIG. 1A. In the compensating position AP2 (shown by broken lines), the compensating element 5 rests against the underside 32 of the second component 3, as is shown in FIG. 1B or 1C.

The base element 4 and the compensating element 5 can each be formed from a plastics material. Alternatively, other materials such as metals can also be provided. The base element 4 and the compensating element 5 can be formed from the same material or from different materials.

Depending on the size and/or number of the radial overhang(s) 7, the inner contour 51 and the outer contour 61 can also come into a form fit with one another. The greater the radial overhang 7 is, the more likely it is that the inner contour 51 and the outer contour 61 will come into a form fit with one another beyond the frictional connection.

Optionally, the inner contour 51 and/or the outer contour 61 can be provided with an engagement structure (not shown in detail). For example, the inner contour 51 and/or the outer contour 61 can be provided with a friction layer, for example a fine-grained or coarse-grained top layer. This increases the force fit between the connecting element 6 and the compensating element 5 in the region of the interengaging contours.

In addition, the device 1 comprises a second nut element 9. The second nut element 9 serves for synchronization of compensating movements of the compensating element 5 with respect to the base element 4 and of the connecting element 6 with respect to the compensating element 5 and to the first nut element 8, as has been described above for FIGS. 1B and 1C. For this purpose, the second nut element 9 is arranged in a recess 52 of the compensating element 5.

Figure 3A:
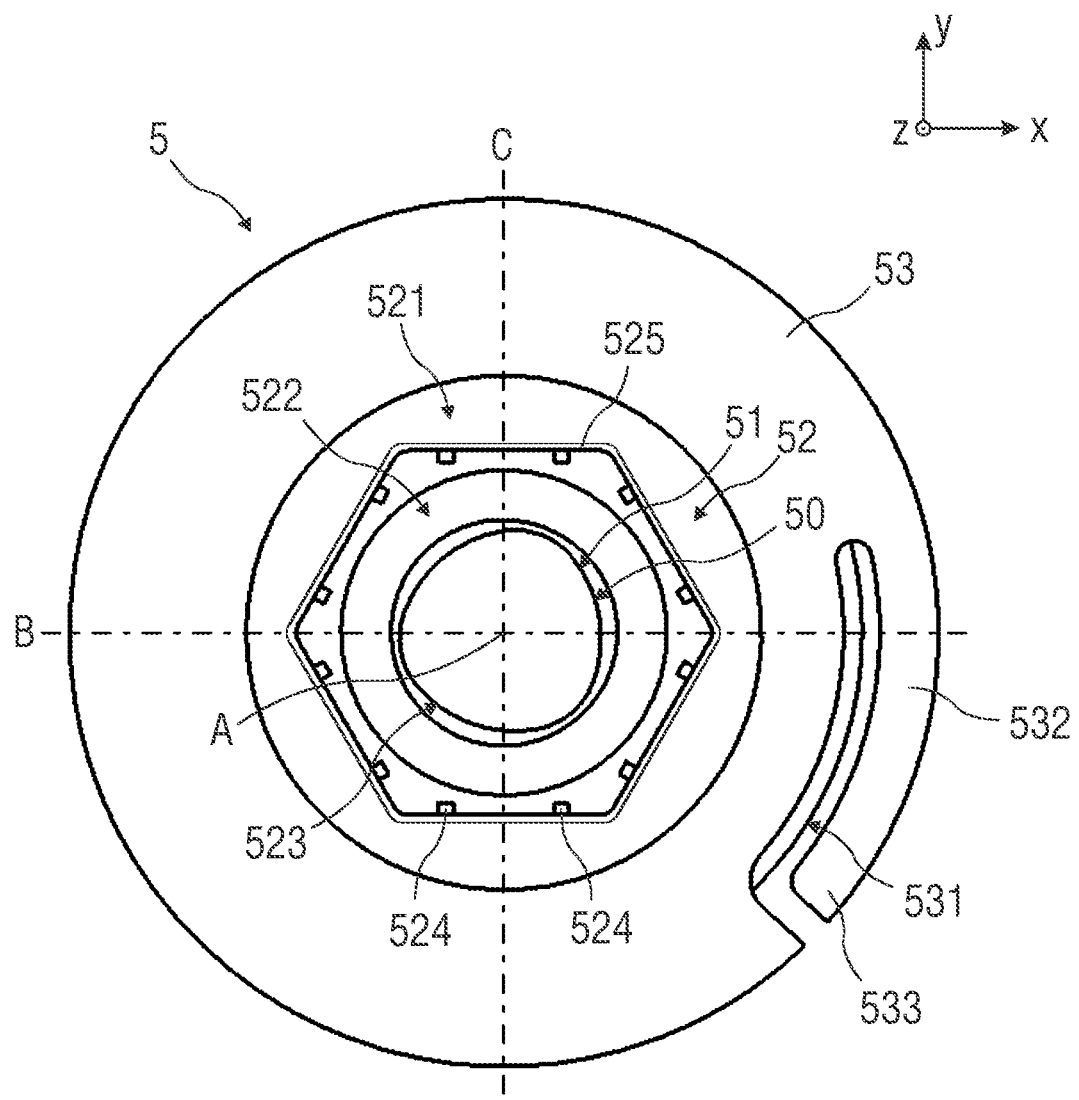
Figure 3B:
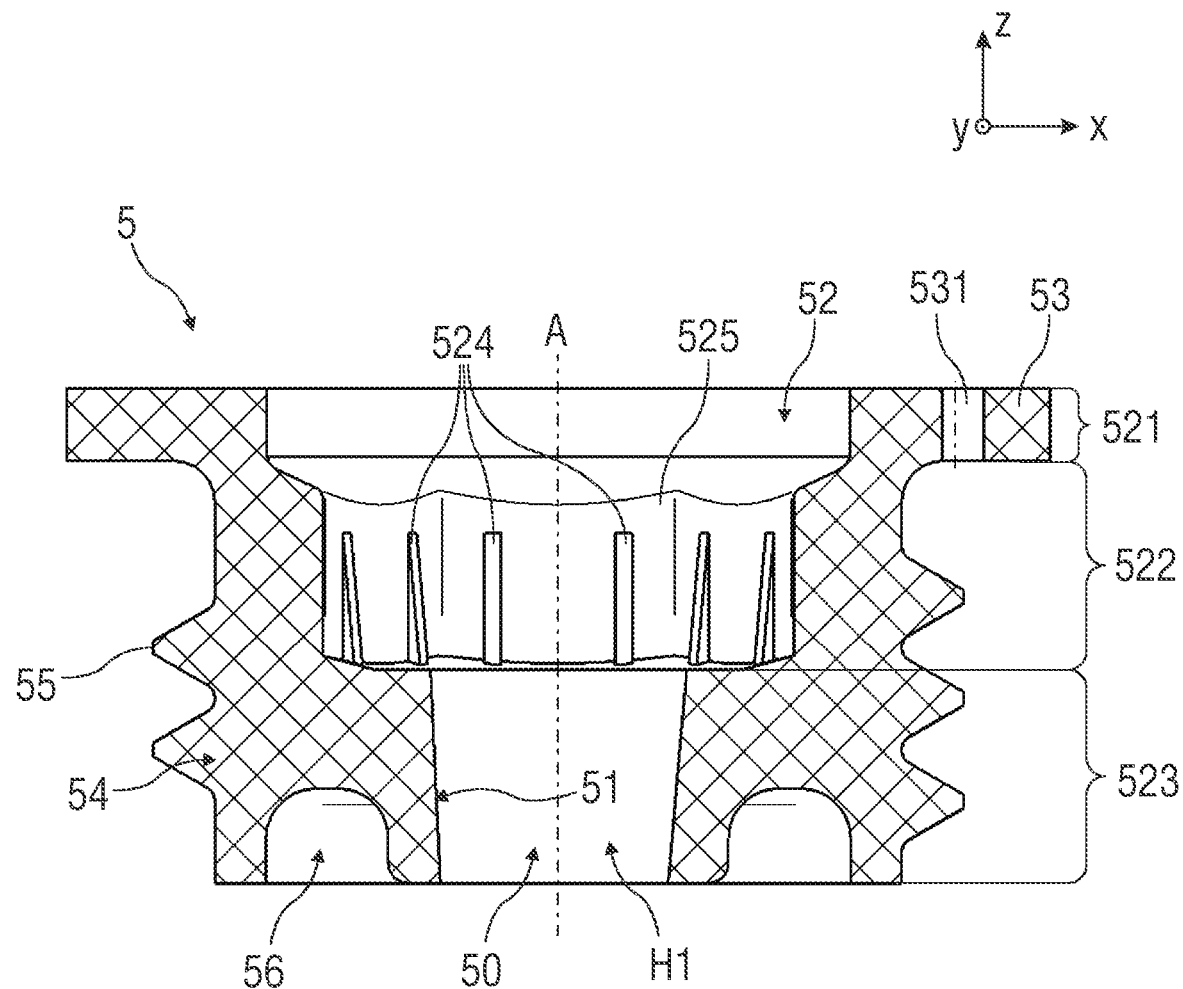

FIGS. 3A and 3B show an embodiment for the axial compensating element 5 in a plan view and in a perspective view respectively.

The axial compensating element 5 has a flange 53. The flange 53 is designed as a projection or a radial overhang on a hollow cylindrical shaft 54.

The recess 52 is stepped. In the embodiment, the recess 52 has a first compensating portion 521 for the second nut element 9, a receptacle portion 522 for the second nut element 9 and a second compensating portion 523 for the compensating element 5.

As shown in FIG. 3A, the second compensating portion 523 has a non-circular inner contour 51, in particular a trilobular shape in cross section, which enables frictional engagement with the connecting element 6 when it is screwed in. As shown in FIG. 2B, the inner contour 51 can also have another suitable cross-sectional shape, in particular a two-cornered, four-cornered or multi-cornered round shape.

As shown in FIG. 3B, the inner contour 51 also has a conical shape in longitudinal section. This conical shape supports the frictional engagement of the connecting element 6 and the compensating element 5 during the tolerance-compensating movement between the two components 2 and 3.

In addition, the inner contour 51 can be provided with an engagement structure, not shown in detail, in particular a friction layer.

The second nut element 9 is arranged in a form-fitting manner in the receptacle portion 522 in its initial position AP1. For this purpose, the receptacle portion 522 has a number of longitudinal webs 524, in particular distributed symmetrically. When the device 1 is assembled, the second nut element 9 is inserted, in particular pressed, into the receptacle portion 522, wherein a form fit between the second nut element 9 and the compensating element 5 is formed by the longitudinal webs 524.

The second nut element 9 is a hexagon nut, for example. For this purpose, the receptacle portion 522 has a corresponding hexagonal contour 525 on the inside and at least in some portions.

A slot-shaped recess 531 is introduced in the region of the flange 53. This forms a flexible securing arm 532, which is explained in more detail in FIG. 7B.

As shown in FIG. 3B, the longitudinal webs 524 extend along the longitudinal axis A at least in some portions in the region of the receptacle portion 522. The height of the longitudinal webs 524 decreases in the direction of the first compensating portion 521. In addition, the longitudinal webs 524 have a shape and/or dimensions such that the second nut element 9 is arranged in the receptacle portion 522 at least in a form-fitting manner, in particular in the direction of rotation of the connecting element 6. In addition, the second nut element 9 is arranged in the receptacle portion 522 with a friction fit, in particular in the axial direction along the longitudinal axis A.

The height of the second nut element 9 corresponds approximately to the height of the receptacle portion 522.

When the connecting element 6 is inserted into the second nut element 9, they come into thread engagement with one another. For this purpose, the second nut element 9 has a corresponding internal thread. The connecting element 6 is designed as a connecting screw or a threaded bolt with a corresponding external thread.

In addition, the inner contour 51 of the compensating element 5 can be designed to be yielding or flexible or resilient. For this purpose, the compensating element 5 comprises an annular groove 56 on its end face opposite the flange 53. The annular groove 56 serves in particular to prevent material build-up during an injection molding process of a compensating element 5 made of plastics material. In addition, such a compensating element 5 made of plastics material with an annular groove 56 enables a resilient shape with a constant thickness.

The compensating element 5 also has a compensating thread 55 in the embodiment shown in FIGS. 3A and 3B. The compensating thread 55 is an internal thread in the embodiment according to each of FIGS. 1A-1C, 5B, 6B and an external thread in the embodiment according to each of FIG. 3B, 4, 7A, 8A.

For thread engagement between the compensating element 5 and the base element 4, the base element 4 has an associated base element thread 42, which is shown by way of example in the following FIGS. 4, 7A and 8A. In the embodiment according to each of FIGS. 4, 7A and 8A, the base element thread 42 is an internal thread. In the embodiment according to each of FIGS. 1A to 1C, 5B and 6B, the base element thread 42 is an external thread.

The base element thread 42 may be formed as a thread having a single crest. Alternatively, the base element thread 42 can also have a plurality of thread turns with corresponding thread tips, in particular two thread tips. With only one thread turn, an open/close tool, and thus cost-effective production, is advantageously made possible. With two or more threads, on the other hand, a rotatable core is also required for demoulding.

FIG. 4 shows a sectional view of the device 1 without the connecting element 6.

The second nut element 9 is arranged in a form-fitting manner in the receptacle portion 522 in the initial position AP1. The first compensating portion 521 represents the synchronizing height S1 which the second nut element 9 axially compensates for when the connecting element 6 is screwed into the first nut element 8 independently of the compensating element 5 for synchronizing the threads according to the second compensating movement AB2, without the compensating element 5 being moved axially, as is described and shown as an example for FIGS. 1B and 1C.

This second compensating movement AB2 serves for synchronization of the thread engagements, in particular the compensating thread engagement between the compensating element 5 and the base element 4 and the fastening engagement between the connecting element 6 and the first nut element 8. For this purpose, the second nut element 9 is arranged, in particular pressed, in the recess 52 in the compensating element 5 by at least the synchronizing height S1, in particular by at least one thread pitch of the first thread engagement G1, lower than the front or flange surface of the compensating element 5.

In other words: The synchronization height S1 corresponds to at least one thread pitch. This inner position of the second nut element 9 in the initial position AP1 enables the axial movement of the second nut element 9 without axial movement of the compensating element 5.

In addition, the second nut element 9 can also move at least partially out of the recess 52. In particular, when the device 1 is assembled, the second nut element 9 can move out of the recess 52 during the second compensating movement AB2 until the second nut element 9 strikes the underside 32 of the second component 3, as shown by way of example in FIGS. 1C and 6B. The sole movement of the second nut element 9 during screwing of the connecting element 6 into the device 1, in particular into the first nut element 8, represents the second compensating movement AB2 relative to the compensating element 5 and base element 4 as well as to the components 2 and 3.

Figure 5A:
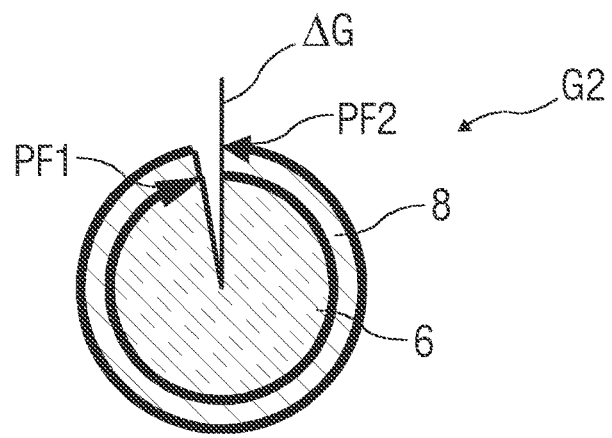
FIG. 5A shows schematic representations of directions of movement of components of the device during a tolerance-compensating connection of the two components and the device in the assembled state, wherein the compensating element is placed in an initial position.

FIG. 5A shows a simplified schematic cross-sectional view of the region of the second thread engagement G2 between the connecting element 6 and the first nut element 8 after the compensating element 5 has been placed in its compensating position AP2 as a result of the first compensating movement AB1 and before the thread starts are threaded in or engage in one another when the connecting element 6 is screwed into the first nut element 8. In this embodiment, there is a thread offset ΔG of approximately zero (also called zero offset for short) between the two thread starts of the second thread engagement G2. Thus, when the connecting element 6 is screwed into the first nut element 8, the two thread starts are threaded together, as shown by the arrows PF1, PF2.

Figure 5B:
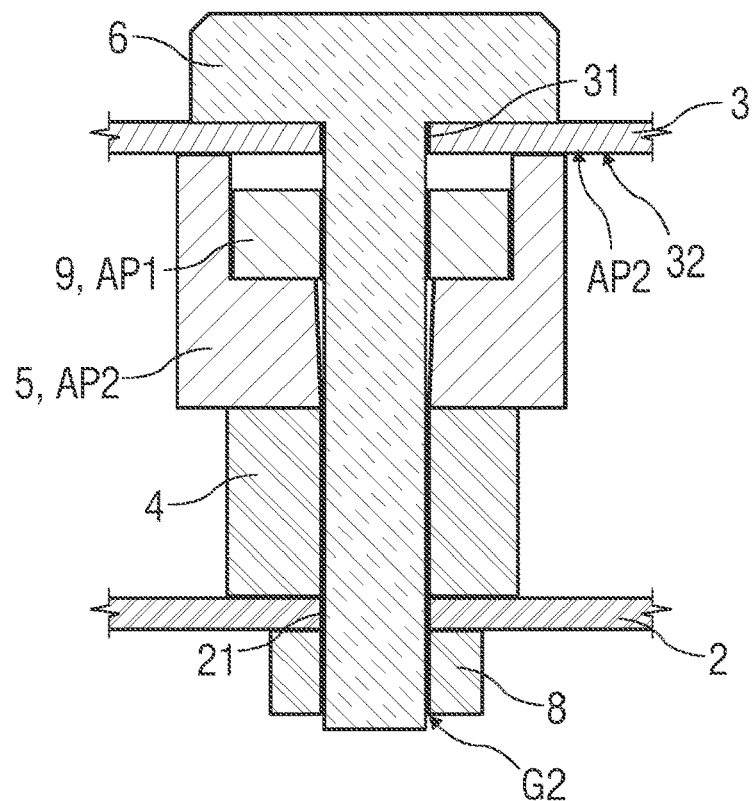
FIG. 5B shows schematic representations of directions of movement of components of the device during a tolerance-compensating connection of the two components and the device in the assembled state, wherein the compensating element is placed in an initial position.

FIG. 5B shows the device 1 in the assembled state, wherein during assembly the compensating element 5 is placed in its compensating position AP2 due to its first compensating movement AB1. Due to the thread offset ΔG, no synchronization of the thread starts of the second thread engagement G2 is required. Thus, in this embodiment, no second compensating movement AB2 of the second nut element 9 takes place. The second nut element 9 remains in its initial position AP1. The compensating element 5 is placed in its compensating position AP2 as a result of the first compensating movement AB1 and is in contact with the underside 32 of the second component 3.

As a result of the thread starts being threaded in without synchronization, the connecting element 6 can be screwed into the first nut element 8 until an underside 62 of the head of the connecting element 6 strikes an upper side 33 of the second component 3. In this assembled end state of the device 1, the two components 2 and 3 are connected to one another by means of the device 1 to compensate for axial tolerances.

The first nut element 8 can be formed separately or can be fastened, in particular welded, to the first component 2.

In an alternative embodiment that is not shown in more detail, the first component 2 has a component thread in the through-opening 21 in which the connecting element 6 engages in a connecting manner, so that the first nut element 8 can be omitted.

Figure 6A:
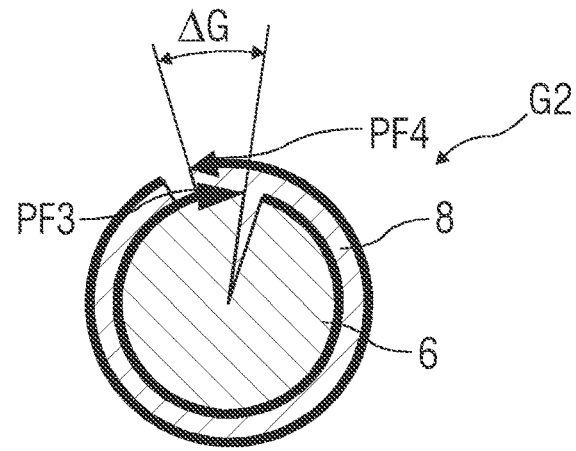
FIG. 6A shows schematic representations of directions of movement of components of the device during a tolerance-compensating connection of the two components and the device in the assembled state, wherein the compensating element is placed in a compensating position.

FIG. 6A shows, in a simplified schematic cross-sectional view, another example of the region of the second thread engagement G2 between the connecting element 6 and the first nut element 8 after the compensating element 5 has been placed in its compensating position AP2 as a result of the first compensating movement AB1 and before the thread starts of the second thread engagement G2 are threaded in or engage in one another when the connecting element 6 is screwed into the first nut element 8. The compensating element 5 is already placed in its compensating position AP2.

As the connecting element 6 is screwed further into the first nut element 8, it may happen that the thread of the connecting element 6 cannot engage directly in the thread of the first nut element 8 or strikes it.

In the exemplary embodiment shown in FIG. 6A, there is a thread offset ΔG of greater than zero between the two thread starts of the second thread engagement G2. It is therefore necessary to synchronize the two thread starts so that they can be threaded in securely, as illustrated by the arrows PF3 and PF4. In the embodiment shown, the thread offset ΔG is approximately 350°.

Therefore, in order to synchronize the two threads of the second thread engagement G2, as a result of the third thread engagement G3 between the second nut element 9 and the connecting element 6 the second nut element 9 is moved axially relative to the compensating element 5 and independently thereof corresponding to the second compensating movement AB2. The second nut element 9 is moved axially, independently of the compensating element 5, counter to the insertion direction of the connecting element 6 until the thread of the connecting element 6 engages in the thread of the first nut element 8. The maximum length of the second compensating movement AB2 corresponds approximately to a synchronization height S1.

Depending on the arrangement of the threads relative to one another, the synchronization height S1 can, under certain circumstances, be up to one rotation of 360° until the threads engage in one another. One revolution can, for example, correspond approximately to one thread pitch. This one thread pitch can in turn correspond approximately to the synchronization height S1 and/or the height gap S.

Figure 6B:
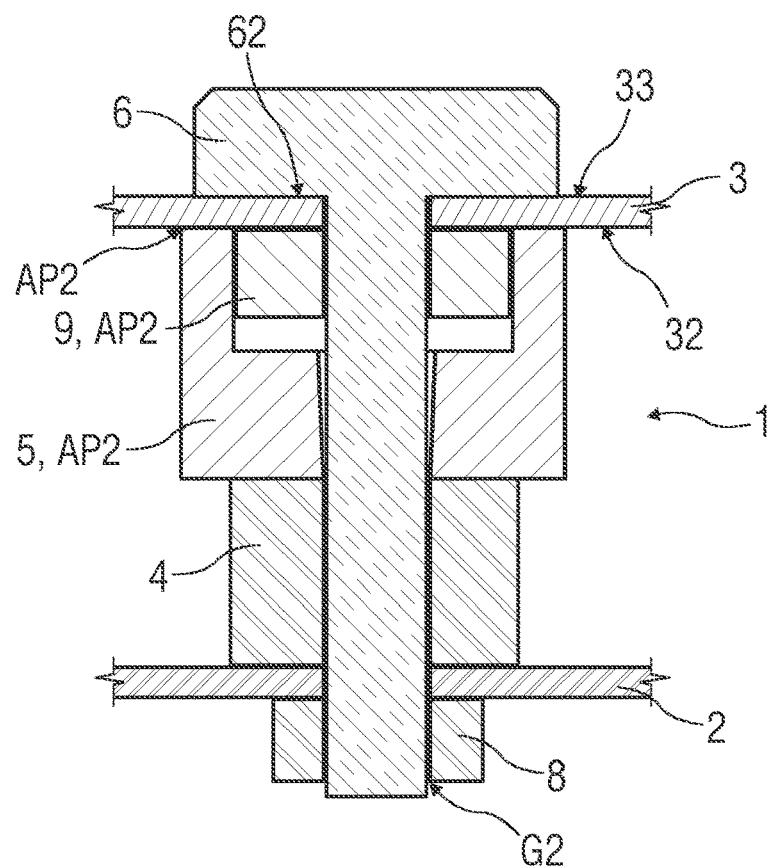
FIG. 6B shows schematic representations of directions of movement of components of the device during a tolerance-compensating connection of the two components and the device in the assembled state, wherein the compensating element is placed in a compensating position.

FIG. 6B shows the device 1 in the assembled state, wherein both the compensating element 5 and the second nut element 9 are placed in the compensating position AP2 due to the large thread offset ΔG.

After synchronization of the threads of the second thread engagement G2, the connecting element 6 is screwed into the first nut element 8 by a further screwing movement of the connecting element 6 into the device 1 until the underside of the head 62 of the connecting element 6 strikes the upper side 33 of the second component 3. In this assembled end state of the device 1, the two components 2 and 3 are connected to one another by means of the device 1 to compensate for axial tolerances.

The first nut element 8 can be formed separately or can be fastened, in particular welded, to the first component 2.

In an alternative embodiment that is not shown in more detail, the first component 2 has a component thread in the through-opening 21 in which the connecting element 6 engages in a connecting manner, so that the first nut element 8 can be omitted.

Figure 7B:
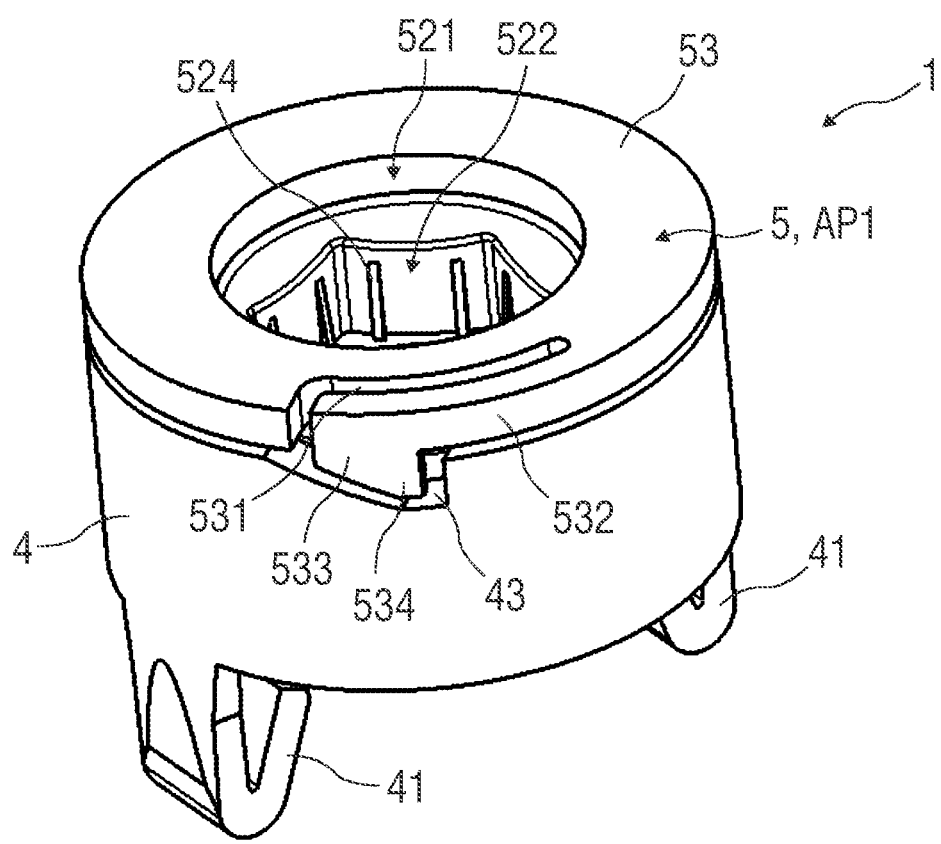
FIG. 7B is a perspective view of the device in the assembled state without a connecting element and without a second nut element, wherein the compensating element is placed in an initial position.

FIGS. 7A and 7B show a perspective and partially sectional view of the device 1 in the assembled state without the connecting element 6 and the second nut element 9, wherein the compensating element 5 is placed in the initial position AP1.

The inner contour 51 is conical with the first radius 512 at the upper end of the second compensating portion 523 and the second radius 513 at the lower end of the second compensating portion. The first radius 512 is greater than the second radius 513. In addition, a chamfer 514 can be made in the upper edge of the second compensating portion 523.

As shown in FIG. 7B, a free end 533 of the securing arm 532 of the compensating element 5 has a projection 534 which engages in a securing recess 43 in the base element 4 before assembly with the components 2 and 3 takes place. Due to the engagement of the projection 534 in the securing recess 43, a protection against torsion is formed between the compensating element 5 and the base element 4. This protection against torsion between the compensating element 5 and the base element 4 serves as a position lock when the device 1 is pre-assembled on the first component 2 and/or as a transport lock for the device 1 before assembly on the components 2 and 3.

Figure 8B:
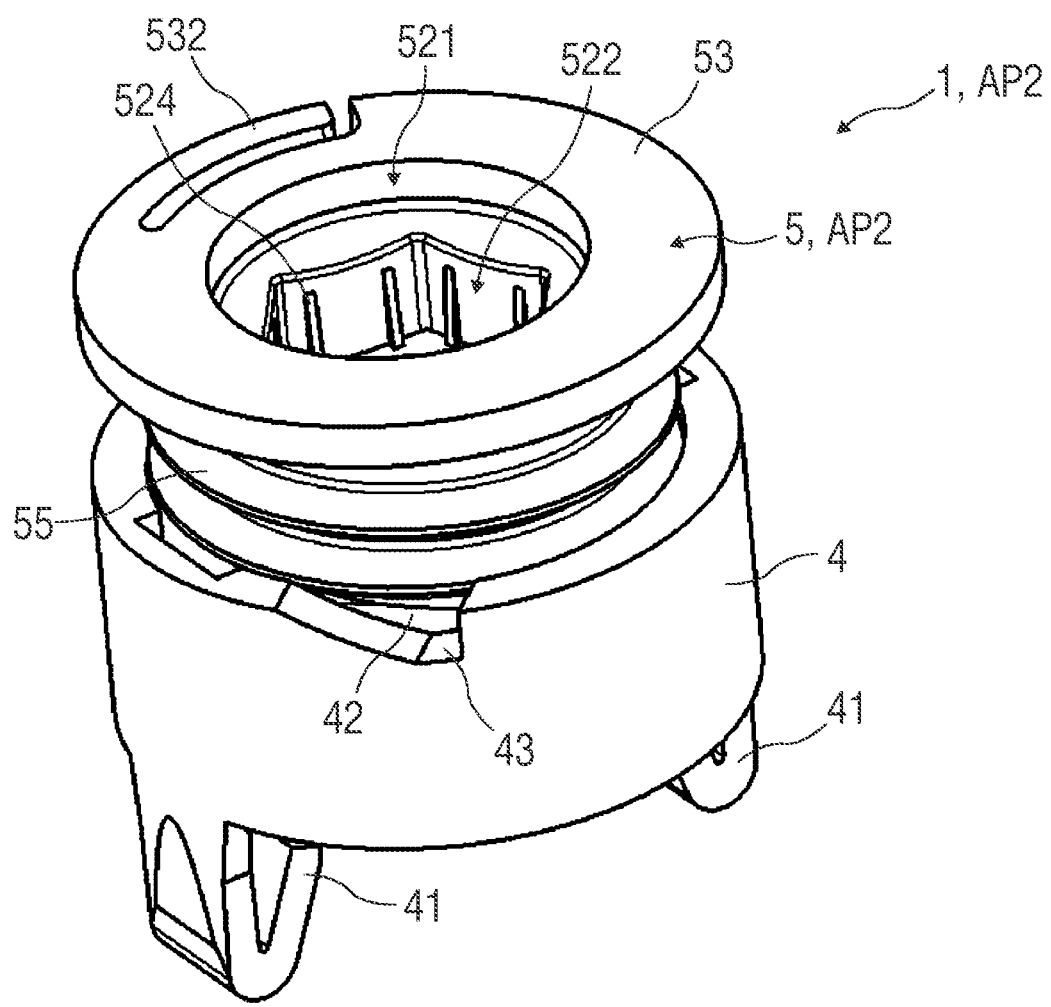
FIG. 8B is a perspective view of the device in the assembled state without a connecting element and without a second nut element, wherein the compensating element is placed in a compensating position.

FIGS. 8A and 8B show a perspective and partially sectional view of the device 1 in the assembled state without the connecting element 6 and the second nut element 9, wherein the compensating element 5 is placed in the compensating position AP2.

LIST OF REFERENCE SIGNS

1 device
2 first component
21 through-opening
3 second component
31 underside
32 underside
33 upper side
4 base element
41 retaining lugs
42 base element thread
43 securing recess
5 compensating element
50 integrated driver
51 inner contour
511 bulge
512 first radius
513 second radius
514 chamfer
52 recess
521 first compensating portion
522 receptacle portion
523 second compensating portion
524 longitudinal web
525 hexagonal contour
53 flange
531 recess
532 securing arm
533 free end
54 hollow cylindrical shaft
55 compensating thread
56 annular groove
6 connecting element
61 outer contour
611 bulge
62 underside of the head
63 screw head
64 threaded shank
7 overhang
8 first nut element
9 second nut element
X longitudinal axis
AB1 first compensating movement
AB2 second compensating movement
AP1 initial position
AP2 compensating position
B, C axes (transverse axes)
H1 first cavity
H2 second cavity
KF flux of force
KF1 changed power flow
PF1 to PF arrows
S height gap
S1 synchronization height
ZS tensile stress
ΔG thread offset

The invention claimed is:

1. A device for compensating for tolerances between two components to be connected to one another, comprising:
   a hollow cylindrical base element, and
   a hollow cylindrical compensating element which is in a first thread engagement with the base element and which can be moved out of an initial position into a compensating position by rotation relative to the base element,
   a connecting element extending at least through a first cavity of the device for connecting the two components,
   wherein the first cavity has an inner contour in cross section and the connecting element has an outer contour in cross section,
   wherein the inner contour or the outer contour has at least one radially extending bulge in cross section, and
   wherein, when the inner contour and the outer contour are oriented concentrically, in cross section at least one radial overhang and/or an integrated driver is formed by the at least one bulge of the inner contour or of the outer contour, and
   wherein the connecting element comes into a second threaded engagement with a first nut element when the device is assembled, and
   wherein the compensating element has a recess in which a second nut element is provided in a rotationally fixed and axially movable manner for synchronizing the first threaded engagement and the second threaded engagement.

2. The device according to claim 1, wherein the bulge is designed in the form of a part of a circle or a segment of a circle or as a spherical bulge.

3. The device according to claim 1, wherein the compensating element is designed in one piece.

4. The device according to claim 1, wherein the device has a spring-free design.

5. The device according to claim 1, wherein if the inner contour is non-circular, the outer contour is circular, or vice versa.

6. The device according to claim 1, wherein the inner contour or the outer contour is oval, elliptical or trilobular in cross section.

7. The device according to claim 1, wherein the inner contour has a conical shape.

8. The device according to claim 1, wherein the inner contour and the outer contour come into frictional engagement with one another at least when the device is assembled.

9. The device according to claim 1, wherein the compensating element and the connecting element come into frictional engagement with one another in such a way that a torque exerted by the connecting element can be transmitted to the compensating element.

10. The device according to claim 1, wherein the inner contour is provided with an engagement structure.

11. The device according to claim 1, wherein the compensating element is at least partially deformable.

12. The device according to claim 1, wherein the compensating element and the base element surround the connecting element coaxially.

13. The device according to claim 1, wherein the compensating element is arranged in the base element in an axially movable manner.

* * * * *